(12) United States Patent
Murase et al.

(10) Patent No.: US 6,200,493 B1
(45) Date of Patent: Mar. 13, 2001

(54) MNMGCUZN FERRITE MATERIAL

(75) Inventors: Taku Murase, Chiba; Takuya Aoki, Chiba-ken; Naoyoshi Sato, Chiba-ken; Isao Kanada, Chiba-ken, all of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/271,432

(22) Filed: Mar. 18, 1999

(30) Foreign Application Priority Data

| May 20, 1998 | (JP) | 10-155328 |
| Oct. 26, 1998 | (JP) | 10-321315 |

(51) Int. Cl.$^7$ ............ C01G 49/00; C04B 35/26; H01G 1/34
(52) U.S. Cl. ............ 252/62.6; 252/62.59; 252/62.62; 252/62.64
(58) Field of Search ............ 252/62.62, 62.6, 252/62.64, 62.59

(56) References Cited

U.S. PATENT DOCUMENTS 4,846,987  7/1989  Togane.

FOREIGN PATENT DOCUMENTS

| 48-65499 | 9/1973 | (JP). |
| 3-66254 | 10/1991 | (JP). |
| 5-75714 | 10/1993 | (JP). |
| 10-25114 | 1/1998 | (JP). |
| WO 99/16090 | 4/1999 | (WO). |

OTHER PUBLICATIONS

J. Sawai, et al., "Low Core Loss Characteristics of MnMgZn Ferrite with Substituted CuO," Journal of Jpn. Appl. Mag., vol. 21, No. 5 (1997), pp. 915–918.

Patent Abstract of Japan, vol. 096, No. 005, May 31, 1996, JP 08 12335, Jan. 16, 1996.

Derwent Publications, AN 90–020182, JP 01 301524, Dec. 5, 1989.

*Primary Examiner*—C. Melissa Koslow
(74) *Attorney, Agent, or Firm*—Oblon, Spivak, McClelland, Maier & Neustadt, P.C.

(57) ABSTRACT

There is disclosed an MnMgCuZn ferrite material which contains ranges of 46.5 to 50.4 mol % of iron oxide, 10.5 to 22.0 mol % of magnesium oxide, 22.5 to 25.0 mol % of zinc oxide, 6.0 to 16.0 mol % of copper oxide, and 0.1 to 3.5 mol % of manganese oxide. Advantages of an MnMgCuZn ferrite material that resistivity is relatively high and material cost is low are utilized to realize a superior MnMgCuZn ferrite material which is much smaller in magnetic loss than conventional materials of the same series and which has a sufficient saturated magnetic flux density.

14 Claims, No Drawings

MNMGCUZN FERRITE MATERIAL

BACKGROUND OF THE INVENTION

The present invention relates to an MnMgCuZn ferrite material, particularly to an MnMgCuZn ferrite material which has a low magnetic loss and a sufficient saturated magnetic flux density and which can be used in a deflection yoke core or a transformer for a high speed scanning cathode-ray tube, particularly a high-definition high-speed scanning cathode-ray tube.

For example, an MnMgZn ferrite material (Japanese Patent Application Laid-open No. 65499/1973) is heretofore used in a deflection yoke core for a high speed scanning cathode-ray tube (hereinafter referred to as CRT). Since the MnMgZn ferrite material is relatively high in resistivity and low in material cost, it has been broadly used as a ferrite material for the deflection yoke core not only domestically but also internationally.

In a method of manufacturing the deflection yoke core, in the same manner as a general ferrite core, materials are mixed, calcined, ground, kneaded together with an appropriate binder, granulated, and press-molded in a predetermined shape using a metallic mold, and the molded material is sintered. When the conventional MnMgZn ferrite material is used, sintering is performed at a temperature of 1250° C. or higher.

Furthermore, recently, CRT display has progressed in raising definition and increasing screen size, while household television has progressed in increasing speed and enlarging angle. Additionally, for the increased definition and speed, a horizontal frequency has become very high. As a result, a ferrite core for use in a deflection yoke is requested to reduce a magnetic loss. Moreover, for the enlarged screen and angle, the ferrite core for use in the deflection yoke needs to have a high saturated magnetic flux density.

On the other hand, in order to prevent thermal runaway at an operation temperature, it is desirable in the deflection yoke core that a temperature coefficient of magnetic loss in the vicinity of 100° C. be negative. In a technique for making negative the temperature coefficient of magnetic loss, a ferrite having a high Curie point is used, and the Curie point necessary for the deflection yoke is about 140° C. or higher.

To suppress ringing phenomenon, the deflection yoke core needs to have a high resistivity. In the ringing phenomenon, an electrostatic capacity is generated between coils or between coil and core, and vertical streaks appear on screen by modulated currents. In order to suppress the ringing phenomenon, the necessary resistivity of the ferrite core is set to $10^6$ Ωcm or more (Japanese Patent Publication No. 75714/1993).

In the aforementioned circumstances, it is disclosed in Japanese Patent Publication No. 66254/1991, 75714/1993 and Journal of the Magnetics Society of Japan 21,915–918 (1997) that when copper oxide is applied in the range of 5 mol % or less (in terms of CuO) to the conventional MnMgZn ferrite material, the magnetic loss is reduced. In order to further increase the saturated magnetic flux density and Curie point, however, the content of copper oxide needs to be increased. In an MnMgCuZn ferrite material containing more than 5 mol % of copper oxide in terms of CuO, there is a problem that when calcining is performed at a temperature of 1250° C. or higher, abnormal grain growth and Cu segregation are caused in a crystal structure, and electromagnetic properties are remarkably deteriorated.

Moreover, it is proposed that the magnetic loss is reduced by remarkably increasing the content of manganese oxide (9 to 15 mol % in terms of MnO, 4.5 to 7.5 mol % in terms of $Mn_2O_3$) in the MnMgCuZn ferrite material (Japanese Patent Application Laid-open No. 25114/1998). When the content of manganese oxide is increased in the MnMgCuZn ferrite material, however, the saturated magnetic flux density at the operation temperature of the deflection yoke (around 100° C.) becomes remarkably low, which disadvantageously reduces the allowable amount of electric currents passed through a deflection yoke coil. Furthermore, since the Curie point is lowered, a problem occurs that the thermal runaway is caused in the operation of the deflection yoke at 100° C. or higher.

SUMMARY OF THE INVENTION

In consideration of the problems, an object of the present invention is to utilize advantages of an MnMgCuZn ferrite material that resistivity is relatively high and material cost is low and to provide a superior MnMgCuZn ferrite material which is much smaller in magnetic loss than conventional materials of the same series and which has a sufficient saturated magnetic flux density.

Specifically, the present invention provides an MnMgCuZn ferrite material which is in a composition range of 46.5 to 50.4 mol % of iron oxide, 10.5 to 22.0 mol % of magnesium oxide, 22.5 to 25.0 mol % of zinc oxide, 6.0 to 16.0 mol % of copper oxide, and 0.1 to 3.5 mol % of manganese oxide.

The MnMgCuZn ferrite material of the present invention is largely lower in magnetic loss, higher in saturated magnetic flux density, and higher in resistivity and Curie point as compared with the conventional MnMgCuZn ferrite material, and useful as a deflection yoke core or a transformer for a CRT, particularly a high-definition CRT. Moreover, sintering can be performed at a relatively low temperature of 1200° C. or less, e.g., about 1000 to 1150° C., and manufacture cost can be lower as compared with the conventional MnMgCuZn ferrite material.

DETAILED DESCRIPTION OF PREFERRED EMBODIMENTS

Preferred embodiments of the present invention will be described hereinafter.

An MnMgCuZn ferrite material of the present invention mainly contains 46.5 to 50.4 mol %, preferably 47.4 to 49.5 mol % of iron oxide in terms of $Fe_2O_3$; 10.5 to 22.0 mol %, preferably 15.4 to 21.0 mol % of magnesium oxide in terms of MgO; 22.5 to 25.0 mol % of zinc oxide in terms of ZnO; 6.0 to 16.0 mol %, preferably 8.0 to 11.0 mol % of copper oxide in terms of CuO; and 0.1 to 3.5 mo i%, preferably 0.2 to 2.0 mol % of manganese oxide in terms of $Mn_2O_3$.

In a composition region outside the aforementioned ranges, for example, when the MnMgCuZn ferrite material is used in a deflection yoke, the magnetic loss is large, and the saturated magnetic flux density, resistivity and Curie point are insufficiently low.

Specifically, for example, if the content of iron oxide is less than 46.5 mol %, the saturated magnetic flux density and Curie point are lowered. If the content of iron oxide exceeds 50.4 mol %, the resistivity is lowered. Moreover, when the content of zinc oxide is less than 22.5 mol %, and sintering is performed at a relatively low calcining temperature in the range of 1000 to 1150° C., the magnetic loss is slightly increased. On the other hand, if the content of zinc oxide exceeds 25.0 mol %, the saturated magnetic flux density and Curie point are lowered. When the content of copper oxide is less than 6.0 mol %, the sintering cannot be performed at the relatively low calcining temperature in the range of 1000 to 1150° C., the magnetic loss is increased, and the saturated magnetic flux density and Curie point are lowered. When the content of copper oxide exceeds 16.0 mol %, the magnetic loss is increased, and the resistivity is lowered. Furthermore, the manganese oxide effectively reduces magnetic anisotropy, promotes grain growth, enhances initial permeability, and reduces hysteresis loss. However, when the content of manganese oxide exceeds 3.5 mol %, the saturated magnetic flux density, Curie point, and resistivity are lowered. Additionally, the magnesium oxide fulfills a supplementary role of maintaining the proportion of the other components.

In addition to the main components, the MnMgCuZn ferrite material of the present invention may contain as secondary components at least one of CaO, NiO, $SiO_2$, $GeO_2$, $ZrO_2$, $MoO_3$, $WO_3$, $Bi_2O_3$, $In_2O_3$, $Cr_2O_3$, $Ta_2O_5$, $Nb_2O_5$, $V_2O_5$, and the like in the proportion of 1 wt % or less. For such sub component, when the content is increased, the magnetic loss of the MnMgCuZn ferrite material is lowered down to a minimum value (while maintaining the Curie point, saturated magnetic flux density, and resistivity). Thereafter, as the content is increased, the magnetic loss turns to be increased. For example, the material preferably contains, in terms of concentration, 1800 ppm or less of $WO_3$, 2900 ppm or less of $Nb_2O_5$, 2350 ppm or less of $V_2O_5$, 2400 ppm or less of $Ta_2O_5$, 6100 ppm or less of $GeO_2$, and 6100 ppm or less of $ZrO_2$. When these ranges are exceeded, the magnetic loss becomes larger than the magnetic loss at the applied amount of 0 ppm. Moreover, when the MnMgCuZn ferrite material contains two or more types of the sub components, the content of each component can appropriately be set in such a manner that the magnetic loss is decreased to a desirable value.

The MnMgCuZn ferrite material of the present invention can be manufactured by sintering the ferrite material in the atmospheric air at a temperature of 1000 to 1200° C. in such a manner that the composition of the main components after sintering falls in the aforementioned range. As compared with the conventional material of the same series, the MnMgCuZn ferrite material of the present invention has a smaller magnetic loss (400 kW/m³ or less on the condition that 100 mT of sine-wave alternating magnetic field with a frequency of 100 kHz is applied in 100° C.), a higher saturated magnetic flux density (180 mT or more at 100° C.), a higher Curie point (140° C. or more), and a higher resistivity ($10^6$ Ωcm or more). Additionally, the material can be sintered at a relatively low temperature (1000 to 1150° C.), and is useful as a deflection yoke core or a transformer for a CRT, particularly a high-definition CRT.

The present invention will next be described in more detail by illustrating examples.

First, each component was weighed so as to have a composition after sintering within following ranges, and wet-mixed in a ball mill of iron steel for 15 hours.

iron oxide ($Fe_2O_3$): 46.5 to 50.4 mol % magnesium oxide (MgO): 10.5 to 22.0 mol % zinc oxide (ZnO): 22.5 to 25.0 mol % copper oxide (CuO): 6.0 to 16.0 mol % manganese oxide ($Mn_2O_3$): 0.1 to 3.5 mol %

Subsequently, the mixed powder was tentatively calcined in the atmospheric air at 900° C. for two hours, and then wet-ground in the ball mill of iron steel for 15 hours. Applied to the resulting MnMgCuZn ferrite powder was 10 wt % of aqueous polyvinyl alcohol to perform granulation. The material was molded in a toroidal shape under a pressure of 1 ton/cm². The molded material was sintered in the atmospheric air at a predetermined temperature in the range of 1000 to 1200° C. for three hours to obtain MnMgCuZn ferrite materials (Examples 1 to 12).

The composition, sintering temperature and retention time of each of the MnMgCuZn ferrite materials (Examples 1 to 12) are shown in Table 1.

Moreover, for each of the MnMgCuZn ferrite materials (Examples 1 to 12), the magnetic loss on the condition that 100 mT of sine-wave alternating magnetic field with the frequency of 100 kHz was applied at 100° C., the saturated magnetic flux density in 100° C., the resistivity at a room temperature, and Curie point were measured. Results are shown in Table 1.

For comparison, MnMgCuZn ferrite materials with the compositions after sintering being deviated from the aforementioned range (Comparative Examples 1 to 7) were prepared in the same manner as the MnMgCuZn ferrite materials (Examples 1 to 12). Additionally, the composition, sintering temperature and retention time of each of the MnMgCuZn ferrite materials (Comparative Examples 1 to 7) were set as shown in Table 2. Moreover, for each of the MnMgCuZn ferrite materials (Comparative Examples 1 to 7), the magnetic loss on the condition that 100 mT of sine-wave alternating magnetic field with the frequency of 100 kHz was applied at 100° C., the saturated magnetic flux density in 100° C., the resistivity at the room temperature, and Curie point were measured. Results are shown in Table 2.

Furthermore, for comparison, MnMgCuZn ferrite materials with the compositions after sintering being deviated from the aforementioned range (MnMgCuZn ferrite materials included in the invention according to Japanese Patent Publication No. 66254/1991 and Japanese Patent Application Laid-open No. 25114/1998) were prepared. Additionally, in the same manner as the examples 1 to 12, the MnMgCuZn ferrite materials were molded into toroidal shapes. Thereafter, the molded materials were sintered in the atmospheric air at 1250° C. for two hours to form MnMgCuZn ferrite materials (Comparative Examples 8, 9). Additionally, the compositions of the MnMgCuZn ferrite materials (Comparative Examples 8, 9) were set as shown in Table 2. Moreover, for each of the MnMgCuZn ferrite materials (Comparative Examples 8, 9), the magnetic loss on the condition that 100 mT of sine-wave alternating magnetic field with the frequency of 100 kHz was applied at 100° C., the saturated magnetic flux density in 100° C., the resistivity at the room temperature, and Curie point were measured. Results are shown in Table 2.

TABLE 1

| | FERRITE MATERIAL COMPOSITION (mol %) | | | | | CALCINING CONDITIONS | | FERRITE MATERIAL PROPERTIES | | | |
|---|---|---|---|---|---|---|---|---|---|---|---|
| | | | | | | CALCINING TEMPERATURE | RETENTION TIME | SATURATED MAGNETIC FLUX DENSITY | MAGNETIC LOSS | RESIS- TIVITY | CURIE POINT |
| SAMPLE | $Fe_2O_3$ | MgO | CuO | ZnO | $Mn_2O_3$ | (° C.) | (HOURS) | (mT) | (kW/m$^3$) | (Ω · cm) | (° C.) |
| EXAMPLE 1 | 49.3 | 16.1 | 9.9 | 24.5 | 0.2 | 1020 | 3 | 181 | 394 | $10^9$ | 143 |
| EXAMPLE 2 | 49.5 | 21.0 | 6.0 | 23.3 | 0.2 | 1020 | 3 | 181 | 381 | $10^{10}$ | 142 |
| EXAMPLE 3 | 49.5 | 19.0 | 8.0 | 23.3 | 0.2 | 1020 | 3 | 198 | 382 | $10^{10}$ | 148 |
| EXAMPLE 4 | 49.6 | 19.1 | 8.0 | 23.0 | 0.2 | 1040 | 3 | 203 | 369 | $10^9$ | 155 |
| EXAMPLE 5 | 49.5 | 19.5 | 8.0 | 22.8 | 0.2 | 1020 | 3 | 209 | 386 | $10^{10}$ | 157 |
| EXAMPLE 6 | 49.5 | 21.5 | 8.0 | 22.5 | 0.2 | 1020 | 3 | 209 | 397 | $10^{10}$ | 160 |
| EXAMPLE 7 | 48.4 | 15.6 | 11.0 | 24.0 | 1.0 | 1020 | 3 | 193 | 372 | $10^9$ | 146 |
| EXAMPLE 8 | 47.4 | 15.6 | 11.0 | 24.0 | 2.0 | 1020 | 3 | 181 | 321 | $10^8$ | 144 |
| EXAMPLE 9 | 47.8 | 16.5 | 10.0 | 23.7 | 2.0 | 1080 | 3 | 186 | 328 | $10^8$ | 143 |
| EXAMPLE 10 | 48.2 | 16.1 | 10.0 | 23.7 | 2.0 | 1100 | 3 | 191 | 339 | $10^7$ | 146 |
| EXAMPLE 11 | 48.9 | 15.4 | 10.0 | 23.7 | 2.0 | 1120 | 3 | 194 | 378 | $10^6$ | 156 |
| EXAMPLE 12 | 46.7 | 11.1 | 15.6 | 23.7 | 2.9 | 1100 | 3 | 215 | 398 | $10^7$ | 163 |

TABLE 2

| | FERRITE MATERIAL COMPOSITION (mol %) | | | | | CALCINING CONDITIONS | | FERRITE MATERIAL PROPERTIES | | | |
|---|---|---|---|---|---|---|---|---|---|---|---|
| | | | | | | CALCINING TEMPERATURE | RETENTION TIME | SATURATED MAGNETIC FLUX DENSITY | MAGNETIC LOSS | RESIS- TIVITY | CURIE POINT |
| SAMPLE | $Fe_2O_3$ | MgO | CuO | ZnO | $Mn_2O_3$ | (° C.) | (HOURS) | (mT) | (kW/m$^3$) | (Ω · cm) | (° C.) |
| COMPARATIVE EXAMPLE 1 | 49.5 | 22.8 | 4.2 | 23.3 | 0.2 | 1100 | 3 | 163 | 394 | $10^{10}$ | 135 |
| COMPARATIVE EXAMPLE 2 | 49.4 | 20.2 | 8.0 | 22.2 | 0.2 | 1020 | 3 | 210 | 415 | $10^{10}$ | 163 |
| COMPARATIVE EXAMPLE 3 | 50.5 | 18.3 | 8.0 | 23.0 | 0.2 | 1160 | 3 | 199 | 379 | $10^4$ | 150 |
| COMPARATIVE EXAMPLE 4 | 49.4 | 14.3 | 10.6 | 25.5 | 0.2 | 1020 | 3 | 178 | 470 | $10^8$ | 134 |
| COMPARATIVE EXAMPLE 5 | 49.5 | 9.7 | 14.6 | 26.0 | 0.2 | 1020 | 3 | 184 | 506 | $10^7$ | 137 |
| COMPARATIVE EXAMPLE 6 | 49.5 | 5.8 | 17.5 | 27.0 | 0.2 | 1020 | 3 | 169 | 597 | $10^6$ | 133 |
| COMPARATIVE EXAMPLE 7 | 49.5 | 15.6 | 11.0 | 24.1 | 3.8 | 1020 | 3 | 149 | 332 | $10^7$ | 132 |
| COMPARATIVE EXAMPLE 8 | 48.2 | 27.8 | 1.4 | 20.0 | 2.6 | 1250 | 2 | 179 | 512 | $10^7$ | 158 |
| COMPARATIVE EXAMPLE 9 | 43.7 | 29.8 | 1.8 | 19.1 | 5.6 | 1250 | 2 | 150 | 402 | $10^7$ | 139 |

As shown in Table 1, it has been confirmed that in each of the MnMgCuZn ferrite materials of the present invention (Examples 1 to 12), the magnetic loss is 400 kW/m$^3$ or less on the condition that 100 mT of sine-wave alternating magnetic field with the frequency of 100 kHz is applied in 100° C., the saturated magnetic flux density is 180 mT or more in 100° C., Curie point is 140° C. or higher, and the resistivity is 10$^6$ Ωcm in or more. It is especially clear that different from the conventional MnMgCuZn ferrite materials shown in Table 2 (Comparative Examples 8, 9), in the MnMgCuZn ferrite materials of the present invention (Examples 1 to 12), the magnetic loss is largely reduced, and the saturated magnetic flux density is largely enhanced.

On the other hand, as shown in Table 2, the MnMgCuZn ferrite materials deviated from the composition range of the present invention (Comparative Examples 1 to 7) correspond to any one of the results that the magnetic loss exceeds 400 kW/m$^3$ on the condition that 100 mT of sine-wave alternating magnetic field with the frequency of 100 kHz is applied in 100° C., the saturated magnetic flux density is less than 180 mT in 100° C., Curie point is lower than 140° C. and that the resistivity is less than $10^6$ Ωcm. Furthermore, it is apparent that when these materials are used in the deflection yoke cores especially for high-definition CRTs, problems are caused.

Subsequently, 24 types of MnMgCuZn ferrite materials (7A-1 to 4, 7B-1 to 4, 7C-1 to 4, 7D-1 to 4, 7E-1 to 4, 7F-1 to 4) were prepared on the same conditions as in Example 7, except that $WO_3$, $Nb_2O_5$, $V_2O_5$, $Ta_2O_5$, $GeO_2$ and $ZrO_2$ were applied in applied amounts shown in Table 3. For these MnMgCuZn ferrite materials and Example 7, the magnetic loss on the condition that 100 mT of sine-wave alternating magnetic field with the frequency of 100 kHz was applied at 100° C., the saturated magnetic flux density in 100° C., the resistivity at the room temperature, and Curie point were measured, and results are shown in Table 3.

TABLE 3

| SAMPLE | ADDITIVES TYPE | APPLIED AMOUNT (ppm) | CALCINING TEMPERATURE (° C.) | RETENTION TIME (HOURS) | SATURATED MAGNETIC FLUX DENSITY (mT) | MAGNETIC LOSS (kW/m³) | RESISTIVITY (Ω · cm) | CURIE POINT (° C.) |
|---|---|---|---|---|---|---|---|---|
| EXAMPLE 7 | — | 0 | 1020 | 3 | 193 | 372 | $10^9$ | 146 |
| 7A-1 | $WO_3$ | 200 | 1020 | 3 | 191 | 362 | $10^9$ | 148 |
| 7A-2 | | 1000 | 1020 | 3 | 189 | 307 | $10^9$ | 147 |
| 7A-3 | | 1700 | 1020 | 3 | 192 | 370 | $10^9$ | 149 |
| 7A-4 | | 2000 | 1020 | 3 | 190 | 493 | $10^9$ | 146 |
| 7B-1 | $Nb_2O_5$ | 200 | 1020 | 3 | 193 | 365 | $10^9$ | 144 |
| 7B-2 | | 1200 | 1020 | 3 | 195 | 328 | $10^9$ | 145 |
| 7B-3 | | 2700 | 1020 | 3 | 191 | 366 | $10^9$ | 143 |
| 7B-4 | | 3000 | 1020 | 3 | 188 | 415 | $10^8$ | 142 |
| 7C-1 | $V_2O_5$ | 200 | 1020 | 3 | 189 | 366 | $10^9$ | 143 |
| 7C-2 | | 2000 | 1020 | 3 | 192 | 319 | $10^9$ | 145 |
| 7C-3 | | 2300 | 1020 | 3 | 195 | 372 | $10^9$ | 147 |
| 7C-4 | | 2500 | 1020 | 3 | 190 | 413 | $10^9$ | 145 |
| 7D-1 | $Ta_2O_5$ | 200 | 1020 | 3 | 189 | 360 | $10^9$ | 148 |
| 7D-2 | | 2000 | 1020 | 3 | 185 | 344 | $10^9$ | 147 |
| 7D-3 | | 2200 | 1020 | 3 | 190 | 361 | $10^9$ | 146 |
| 7D-4 | | 2500 | 1020 | 3 | 190 | 420 | $10^8$ | 147 |
| 7E-1 | $GeO_2$ | 200 | 1020 | 3 | 196 | 368 | $10^9$ | 148 |
| 7E-2 | | 1800 | 1020 | 3 | 193 | 313 | $10^9$ | 146 |
| 7E-3 | | 6000 | 1020 | 3 | 199 | 364 | $10^8$ | 149 |
| 7E-4 | | 6200 | 1020 | 3 | 200 | 452 | $10^8$ | 148 |
| 7F-1 | $ZrO_2$ | 200 | 1020 | 3 | 198 | 370 | $10^9$ | 146 |
| 7F-2 | | 2200 | 1020 | 3 | 201 | 324 | $10^9$ | 145 |
| 7F-3 | | 6000 | 1020 | 3 | 201 | 371 | $10^8$ | 147 |
| 7F-4 | | 6200 | 1020 | 3 | 197 | 431 | $10^8$ | 144 |

As shown in Table 3, in Examples 7A-1 to 3 containing $WO_3$ in a concentration range of 1800 ppm or less, Examples 7B-1 to 3 containing $Nb_2O_5$ in a concentration range of 2900 ppm or less, Examples 7C-1 to 3 containing $V_2O_5$ in a concentration range of 2350 ppm or less, Examples 7D-1 to 3 containing $Ta_2O_5$ in a concentration range of 2400 ppm or less, Examples 7E-1 to 3 containing $GeO_2$ in a concentration range of 6100 ppm or less, and Examples 7F-1 to 3 containing $ZrO_2$ in a concentration range of 6100 ppm or less, the magnetic loss of each example is as low as or lower than the magnetic loss of Example 7. It has also been confirmed that each of these MnMgCuZn ferrite materials maintains Curie point, saturated magnetic flux density, and resistivity at the same levels as those in Example 7.

What is claimed is:

1. An MnMgCuZn ferrite material comprising main components consisting of an iron oxide, and a magnesium oxide, a zinc oxide, a copper oxide, and a manganese oxide, the ferrite material comprising 46.5 to 50.4 mol % of the iron oxide, 10.5 to 22.0 mol % of the magnesium oxide, 22.5 to 25.0 mol % of the zinc oxide, 6.0 to 16.0 mol % of the copper oxide, and 0.1 to 3.5 mol % of the manganese oxide, and further comprising 200 ppm to 1% of at least one secondary component selected from the group consisting of $ZrO_2$, $WO_3$, $Ta_2O_5$, $Nb_2O_5$, $V_2O_5$, and $GeO_2$.

2. The MnMgCuZn ferrite material according to claim 1, wherein the concentration ranges for the secondary components are 1800 ppm to 200 ppm of $WO_3$, 2900 ppm to 200 ppm of $Nb_2O_5$, 2350 ppm to 200 ppm of $V_2O_5$, 2400 ppm to 200 ppm of $Ta_2O_5$, 6100 ppm to 200 ppm of $GeO_2$, and 6100 ppm to 200 ppm of $ZrO_2$.

3. The MnMgCuZn ferrite material according to claim 1, wherein sintering is performed in atmospheric air at a temperature in the range of 1000 to 1200° C.

4. The MnMgCuZn ferrite material according to claim 1, wherein a magnetic loss is 400 kW/m³ or less when 100 mT of sine-wave alternating magnetic field with a frequency of 100 kHz is applied at 100° C.

5. The MnMgCuZn ferrite material according to claim 1, wherein a saturated magnetic flux density at 100° C. is 180 mT or more.

6. The MnMgCuZn ferrite material according to claim 1, wherein Curie point is 140° C. or more.

7. The MnMgCuZn ferrite material according to claim 1, wherein resistivity is $10^6$ Ωcm or more.

8. A deflection yoke core comprising the MnMgCuZn ferrite material of claim 1.

9. A deflection yoke core comprising the MnMgCuZn ferrite material of claim 2.

10. A transformer for a high speed scanning cathode-ray tube comprising the MnMgCuZn ferrite material of claim 1.

11. A transformer for a high speed scanning cathode-ray tube comprising the MnMgCuZn ferrite material of claim 2.

12. A process for preparing the MnMgCuZn ferrite material of claim 1 comprising:

mixing metal oxides comprising an iron oxide, a magnesium oxide, a zinc oxide, a copper oxide and a manganese oxide, and at least one secondary component selected from the group consisting of $ZrO_2$, $WO_3$, $TA_2O_5$, $Nb_2O_5$ and $GeO_2$;

calcining said mixed metal oxides in air, thereby forming a MnMgCuZn ferrite.

13. A process for preparing the deflection yoke core of claim 8 comprising:

mixing metal oxides comprising an iron oxide, a magnesium oxide, a zinc oxide, a copper oxide and a manganese oxide, and at least one secondary component selected from the group consisting of $ZrO_2$, $WO_3$, $TA_2O_5$, $Nb_2O_5$ and $GeO_2$;

calcining said mixed metal oxides in air;

grinding said calcined mixed metal oxides, thereby forming a MnMgCuZn ferrite powder;

kneading said MnMgCuZn ferrite powder with a binder;

granulating said MnMgCuZn ferrite powder;

molding said granulating MnMgCuZn ferrite powder; and sintering said molded MnMgCuZn ferrite powder.

14. A process for preparing the transformer for a high speed scanning cathode-ray tube of claim 10 comprising:

mixing metal oxides comprising an iron oxide, a magnesium oxide, a zinc oxide, a copper oxide and a manganese oxide, and at least one secondary component selected from the group consisting of $ZrO_2$, $WO_3$, $TA_2O_5$, $Nb_2O_5$ and $GeO_2$;

calcining said mixed metal oxides in air;

grinding said calcined mixed metal oxides, thereby forming a MnMgCuZn ferrite powder;

kneading said MnMgCuZn ferrite powder with a binder;

granulating said MnMgCuZn ferrite powder;

molding said granulating MnMgCuZn ferrite powder; and sintering said molded MnMgCuZn ferrite powder.

\* \* \* \* \*